United States Patent

Fan

(10) Patent No.: US 8,391,863 B2
(45) Date of Patent: Mar. 5, 2013

(54) ASSEMBLY COMPRISING A CELLULAR NETWORK AND AT LEAST ONE MOBILE TERMINAL, METHOD FOR THE OPERATION OF SUCH AN ASSEMBLY, MOBILE TERMINAL AND CONTROL DEVICE

(75) Inventor: Changpeng Fan, Berlin (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1008 days.

(21) Appl. No.: 12/097,405

(22) PCT Filed: Dec. 12, 2006

(86) PCT No.: PCT/EP2006/069590
§ 371 (c)(1),
(2), (4) Date: Jun. 26, 2008

(87) PCT Pub. No.: WO2007/068691
PCT Pub. Date: Jun. 21, 2007

(65) Prior Publication Data
US 2008/0293415 A1    Nov. 27, 2008

(30) Foreign Application Priority Data
Dec. 13, 2005 (DE) .................... 10 2005 060 634

(51) Int. Cl.
*H04W 4/00* (2009.01)
(52) U.S. Cl. .............. 455/435.1; 455/435.2; 455/432.1; 455/436; 455/513; 455/439; 375/260
(58) Field of Classification Search .............. 455/435.2, 455/1, 437
See application file for complete search history.

(56) References Cited

U.S. PATENT DOCUMENTS

| | | | |
|---|---|---|---|
| 6,438,378 B1 * | 8/2002 | Kouno | 455/439 |
| 6,999,762 B2 * | 2/2006 | Uchida | 455/432.1 |
| 7,212,832 B2 * | 5/2007 | Yokota | 455/513 |
| 7,643,565 B2 * | 1/2010 | Mukai | 375/260 |
| 2003/0176190 A1 * | 9/2003 | Mohebbi et al. | 455/436 |
| 2004/0142693 A1 | 7/2004 | Feder et al. | |
| 2004/0203732 A1 | 10/2004 | Brusilovsky et al. | |
| 2005/0227692 A1 | 10/2005 | Kawashima et al. | |
| 2005/0272428 A1 | 12/2005 | Tanabe et al. | |
| 2005/0286495 A1 | 12/2005 | Menon et al. | |
| 2006/0105746 A1 | 5/2006 | Pirila et al. | |
| 2008/0064401 A1 * | 3/2008 | Forssell et al. | 455/436 |

FOREIGN PATENT DOCUMENTS

| | | |
|---|---|---|
| DE | 10223546 A1 | 2/2003 |
| DE | 202005010239 U1 | 3/2006 |
| EP | 1335530 A1 | 8/2003 |
| EP | 1603290 A2 | 12/2005 |
| WO | 9949690 A1 | 9/1999 |
| WO | 2006048760 A1 | 5/2006 |

* cited by examiner

*Primary Examiner* — Charles Shedrick
(74) *Attorney, Agent, or Firm* — Laurence A. Greenberg; Werner H. Stemer; Ralph E. Locher

(57) ABSTRACT

In order to be able to flexibly and dynamically control the selection of an access network to be used by a mobile terminal, an assembly contains a cellular network which is provided with a core network and several access networks for connecting mobile terminals to the core network, and at least one mobile terminal. The mobile terminal is equipped with a decision unit at the terminal end to select the access network to be used by the mobile terminal while the cellular network encompasses a decision unit at the network end to select the access network to be used by the mobile terminal as well as a control device for controlling the decision unit located at the terminal end and at the network end.

18 Claims, 1 Drawing Sheet

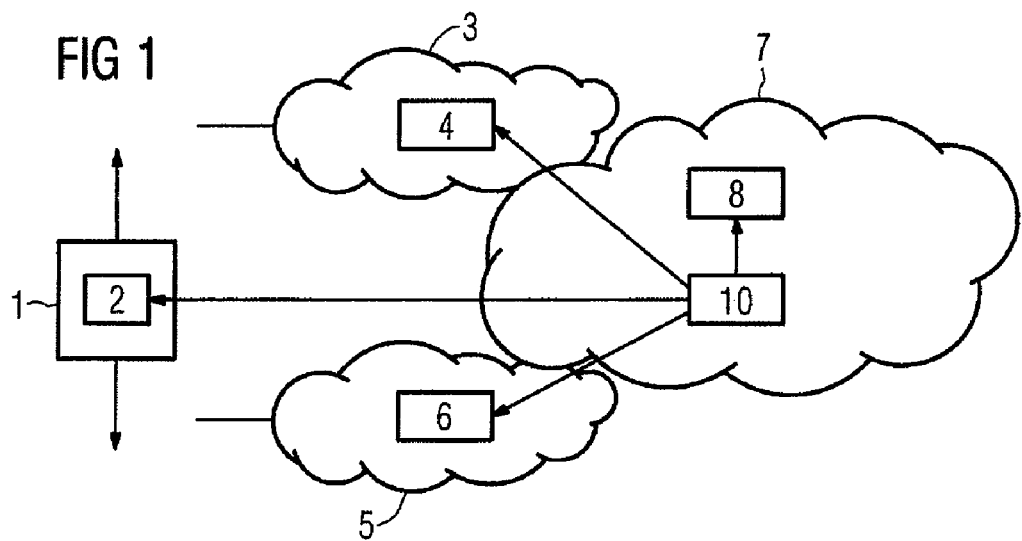
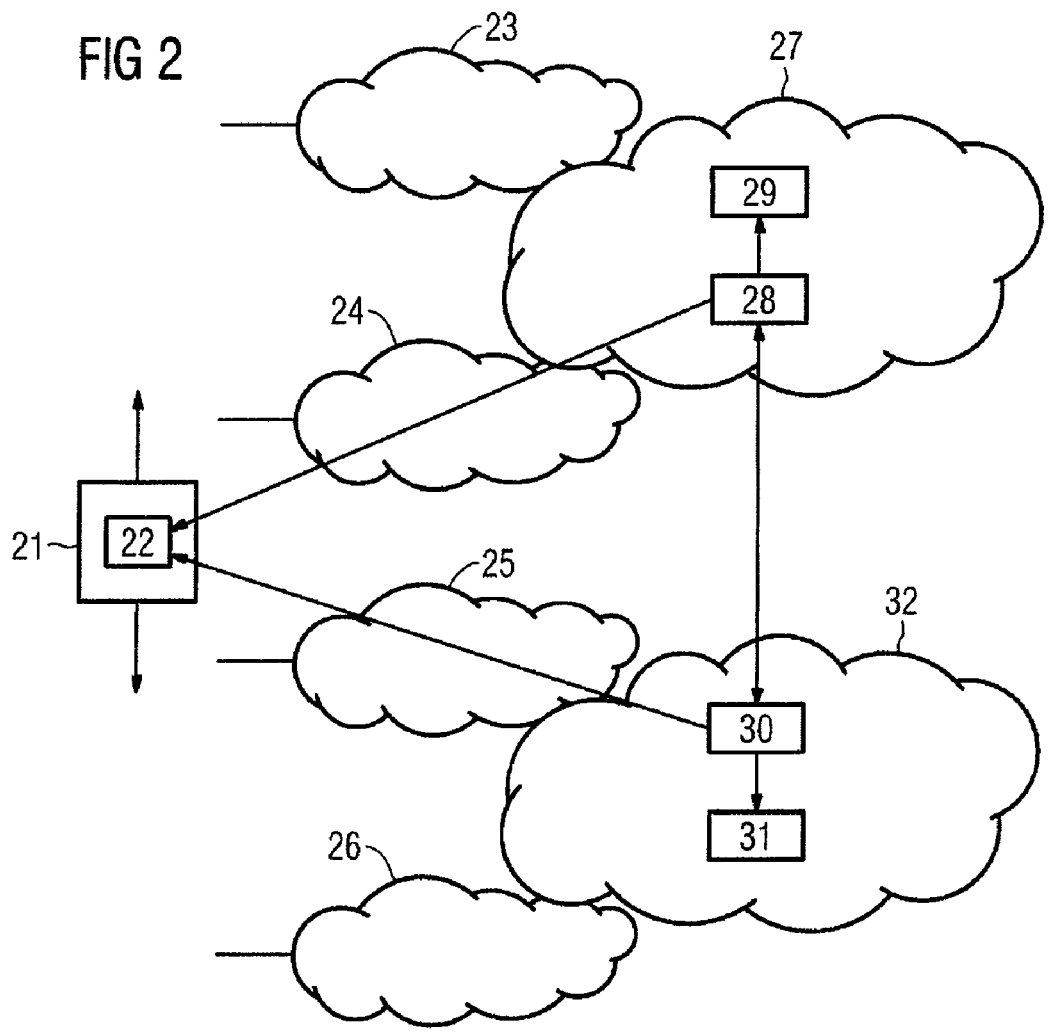

ASSEMBLY COMPRISING A CELLULAR NETWORK AND AT LEAST ONE MOBILE TERMINAL, METHOD FOR THE OPERATION OF SUCH AN ASSEMBLY, MOBILE TERMINAL AND CONTROL DEVICE

BACKGROUND OF THE INVENTION

Field of the Invention

The invention relates to an assembly comprising a cellular network which has a mobile core network and a number of access networks for connecting mobile terminals to the mobile core network, and comprising at least one mobile terminal.

US 2005/227692 A1 relates to a network selection method, wherein a mobile terminal, during a conversation with a subscriber, selects a network from a multiplicity of networks if the connection deteriorates or a further network is detected. The continuance of the connection between the parties is ensured by selecting a network under supervision of the server system.

In the context of cellular networks of the so-called third generation, it is usual that, for connecting mobile terminals, a cellular network has a number of access networks which are connected to a so-called mobile core network of the cellular network. The terms of the access network and the mobile core network are generally known to the expert in the field of mobile radio. Thus, the mobile core network, in particular, contains switching- and network-oriented functions and devices such as, for example, switching centers and home data bases. In comparison, access networks, in particular, comprise the radio-related part of a cellular network, i.e., in particular, this is the base station system. A mobile terminal can be, for example, a mobile radio telephone, a mobile computer ("notebook"), a so-called PDA (personal digital assistant) with a radio interface or also a radio module. Radio modules are used for establishing a communication link via a communication network in the form of a cellular network in the most varied areas such as, for example, for applications in the so-called machine-to-machine (M2M) field or for supporting applications in the field of telematics.

An access network can be, for example, such a one in accordance with the GPRS (General Packet Radio Service) or the UMTS (Universal Mobile Telecommunication System) standard. Various access networks usually overlap wholly or partially with respect to their geographic coverage, i.e. at a particular geographic location, a number of access networks are frequently available to a mobile terminal for utilizing mobile radio services. These can be different access networks of a network operator (which, in the context of the present invention, together with a mobile core network connected to them are called cellular network) or also access networks of different network operators.

The average number of access networks available at a geographic location will increase further due to future generations of radio standards (i.e. particularly those beyond the third mobile radio generation) which lead to the provision of evermore powerful access networks. In such an environment, it is of high significance how one of the available access networks is selected for a mobile terminal. Such a selection is required both when the mobile terminal registers in the cellular network for the first time via one of the access networks after the mobile terminal is switched on and at later times under certain circumstances such as, for example, in the case of a deterioration of the transmission quality of the access network currently used. A change of the mobile terminal from one access network to another one is generally also called a "handover". In this context, it is also necessary, apart from selecting the access network to be used, to establish the protocol or protocol layer, respectively, with which the handover is to take place.

The selection of one of the available access networks usually occurs by taking into consideration certain aspects or criteria. In general, it is thus worthwhile for a mobile terminal or its user, respectively, to use at any time the best possible connection under the respective circumstances, i.e. select the access network by significantly taking into consideration the quality of the connection. Apart from the transmission quality, a multiplicity of other criteria can have an influence on which one represents the preferred access network from the point of view of the mobile terminal (or its user, respectively). Examples of this are the costs for a call or a data transmission, general preferences of the user or characteristics of the mobile terminal.

In contrast, a selection of the access network to be used by a mobile terminal in accordance with other criteria such as, for example, an optimization of the utilization of the available transmission resources may be appropriate from the point of view of the cellular network or its network operator, respectively. In the individual case, it is quite conceivable that the access network preferred in a certain situation from the point of view of the mobile terminal (or its user, respectively) and the access network preferred from the point of view of the cellular network (or its network operator) do not match.

BRIEF SUMMARY OF THE INVENTION

The present invention is based on the object, therefore, of specifying an assembly by means of which the selecting of an access network to be used by a mobile terminal can be controlled in a flexible and dynamic manner.

According to the invention, this object is achieved by an assembly comprising a cellular network which has a mobile core network and a number of access networks for connecting mobile terminals to the mobile core network, and comprising at least one mobile terminal, wherein the mobile terminal has a decision unit at the terminal end for selecting the access network to be used by the mobile terminal, and the cellular network has a decision unit at the network end for selecting the access network to be used by the mobile terminal, and a control device for controlling the decision unit at the terminal end and the decision unit at the network end.

The assembly according to the invention is preferred since it makes it possible to determine in a flexible and dynamic manner whether decisions with regard to the selection of the access network are to be made by the respective mobile terminal or by the cellular network. The basic flexibility that decisions can be made both by the mobile terminal and by the cellular network is given by the fact that the mobile terminal has a decision unit at the terminal end and the cellular network has a decision unit at the network end, both of which are in each case constructed for selecting the access network to be used by the mobile terminal. In addition, the decision units are preferably in each case also capable of determining the protocol or protocol layer, respectively, by means of which the connection to the selected access network is to be set up. The control device which is arranged both for controlling the decision unit at the terminal end and for controlling the decision unit at the network end makes it possible that it is possible to determine in a flexible and dynamic manner which of the two decision units are to carry out the selection of one of the available access networks. In this context, for example, the capacity utilization of the cellular network and of its access networks, respectively, or also possible disturbances, can be taken into consideration. In addition, for example, the mobile terminals of users having high turnovers can be allowed a free selection of the access network to be used whilst the access network to be used is selected at the network end for the mobile terminals of the remaining users.

In this context, it must be noted that generally both the use of the decision unit at the network end and the use of the decision unit at the terminal end for selecting the access network to be used by the mobile terminal has advantages and disadvantages. Thus, a mobile terminal, in comparison with the cellular network, for example, only has limited information, particularly with regard to the overall situation of the cellular network. For this reason, the cellular network, more than the mobile terminal, should be generally capable of making decisions which are of use to the overall system consisting of the cellular network and mobile terminal (or a multiplicity of mobile terminals, respectively). However, selecting the access network to be used by the decision unit at the network end has the disadvantage that the decision unit at the network end must make corresponding decisions for a multiplicity of mobile terminals in this case. There is thus a risk that the decision unit at the network end becomes a bottleneck for the cellular network. In this case, the selection of the access network can be unnecessarily delayed due to the high load on the decision unit at the network end and the delay to be expected in the transmission of the decision from the decision unit at the network end to the mobile terminal. Due to its flexibility, the assembly according to the invention advantageously avoids the disadvantages of a rigid selection at the terminal end or at the network end of the access network to be used. In this context, it is preferably also possible that the control device instructs the decision unit at the terminal end and the decision unit at the network end to communicate with one another and to jointly select the access network to be used.

It should be generally pointed out that both the decision units and the control device are logical components. This means that these devices are defined by their function and do not necessarily need to be implemented in the form of separate hardware such as, for example, a special network node or a separate electronic logic chip. Instead, the corresponding function, for example of the control device, can be implemented, for example, as additional function of an existing network node or, for example, can also be distributed over a number of network nodes.

The assembly according to the invention is preferably designed in such a manner that the decision unit at the network end and/or the control device are arranged completely or partially in the mobile core network of the cellular network. This embodiment is advantageous since the mobile core network represents the central component of the cellular network and is thus particularly suitable for implementing the decision unit at the network end and the control device. The decision unit at the network end and the control device can be preferably implemented in the form of a common component in the mobile core network.

In a preferred embodiment, the assembly according to the invention can also be designed in such a manner that the decision unit at the terminal end and/or the decision unit at the network end is or are constructed for selecting the access network to be used by the mobile terminal by means of programmable or configurable rules. This is advantageous since it can be established in a simple and flexible manner by means of programmable or configurable rules which of the available access networks is to be selected in a respective situation. In addition, it is possible to advantageously respond rapidly and flexibly to changes in the network conditions or, for example, also to the provision of a new access network by this means.

The assembly according to the invention can also be advantageously designed in such a manner that the control device is constructed for controlling the decision unit at the network end and the decision unit at the terminal end by means of programmable or configurable rules. Controlling the decision unit at the network end and the decision unit at the terminal end by means of the control device by means of programmable or configurable rules is preferred since it is thus possible to modify or newly add rules in a simple manner and the behavior of the control device can thus be flexibly adapted to altered requirements. In particular, this also provides for a dynamic consideration of changes in the network conditions. In this context, individual rules can apply either to all or also only to particular mobile terminals. Furthermore, for example, rules can be created according to geographic or temporal criteria.

The assembly according to the invention can also be preferably formed in such a manner that the control device is constructed for communicating activation and deactivation signals, respectively, to the decision unit at the terminal end and/or the decision unit at the network end. This embodiment is preferred since it enables the control device at any time to activate or to deactivate the decision unit at the terminal end and/or at the network end. The control device can thus generally specify whether an access network is to be selected at the terminal end or at the network end.

The assembly according to the invention can also be designed in such a manner that the mobile core network and/or at least one of the access networks has or have at least one further decision unit which can be controlled by the control device. This preferred embodiment of the assembly according to the invention makes it possible to introduce a multiplicity of decision units at the network end and to arrange these, for example, in a tree-like hierarchy. Thus, for example, the possibility exists that, in the normal case, decision units of the respective access networks select the access network to be used for the mobile terminal. If a more central control is required under certain circumstances, the decision units of the access networks as well as the decision unit at the terminal end can be deactivated by the control device and at the same time a central decision unit at a higher level in the hierarchy can be activated, for example, in the mobile core network.

In a further preferred embodiment of the assembly according to the invention, the decision unit at the terminal end and/or the decision unit at the network end is or are constructed for selecting the access network to be used by the mobile terminal with an existing connection of the mobile terminal to one of the access networks. This embodiment is preferred since it provides for the selection of a further one of the available access networks in the case where the mobile terminal is already registered in the cellular network by means of an access network. This can be the case, for example, if the mobile terminal leaves the area of the currently used access network due to a change in location. In addition, however, a change of access network can also be triggered by various other events such as, for example, a weather-related change in the network conditions or the use of a certain service by the mobile terminal which renders another access network necessary or desirable. It should be pointed out that, in principle, as a result of the selection of the access network to be used, an acknowledgement of the access network already currently used can also exist. This can happen, for example, if a change of the access network does not bring any advantages or is not possible for certain reasons in the relevant situation from the point of view of the decision unit concerned.

The assembly according to the invention is preferably designed in such a manner that the decision unit at the terminal end and/or the decision unit at the network end is or are constructed for selecting the access network to be used by the mobile terminal when the mobile terminal is switched on. This makes it advantageously possible that the decision unit at the terminal end or the decision unit at the network end carries out a selection of the access network to be used even when the mobile terminal is switched on, i.e. in a situation in which the mobile terminal is not yet registered in any of the available access networks.

In a further preferred embodiment of the assembly according to the invention, the control device is connected to a further control device of a further cellular network. This embodiment provides the advantage that control information can be exchanged between the control devices of cellular networks of different network operators. As a result, for example, the control device of the further cellular network can be informed about the criteria according to which it is intended to control the decision unit at the terminal end and the decision unit at the network end for mobile terminals of users of the cellular network. In real terms, the control information can state, for example, that certain "premium" users, i.e. users with high turnovers or a special contract, are to be allowed a free selection of the access network by means of the decision unit at the terminal end. In this context, it is up to the control device of the further cellular network (or its network operator) to decide whether the received control information is taken into consideration—wholly or partially—in the further cellular network, or not.

In addition, the invention relates to a method for the operation of an assembly comprising a cellular network which has a mobile core network and a number of access networks for connecting mobile terminals to the mobile core network, and comprising at least one mobile terminal.

With regard to the method, the invention is based on the object of specifying a method in which the selecting of an access network to be used by a mobile terminal can be controlled in a flexible and dynamic manner.

According to the invention, this object is achieved by a method for the operation of an assembly comprising a cellular network which has a mobile core network and a number of access networks for connecting mobile terminals to the mobile core network, and comprising at least one mobile terminal, wherein the terminal has a decision unit at the terminal end for selecting the access network to be used by the mobile terminal and the cellular network has a decision unit at the network end for selecting the access network to be used by the mobile terminal, comprising the following method step: controlling the decision unit at the terminal end and/or the decision unit at the network end by means of a control device arranged in the cellular network.

The method according to the invention is advantageous since it provides for a control at the network end of the decision unit at the terminal end and of the decision unit at the network end by the control device arranged in the cellular network. By this means, it is possible to specify in a flexible manner which of the two decision units is to perform the selection of the access network to be used by the mobile terminal. This advantageously dispenses with the necessity of generally and thus inflexibly specifying whether the access network to be used is to be selected at the terminal end or at the network end.

The method according to the invention preferably proceeds in such a manner that a decision unit and/or control device at the network end, arranged completely or partially in the mobile core network of the cellular network, is used. Using a control device arranged in the mobile core network of the cellular network is preferred since the mobile core network is connected to the various access networks of the cellular network and, as a result, central control is made possible.

In a particularly preferred embodiment of the method according to the invention, the decision unit at the terminal end and/or the decision unit at the network end is or are controlled by the control device by means of configurable or programmable rules. As has already been explained previously in conjunction with the assembly according to the invention, the use of configurable or programmable rules is preferred since it provides for a particularly high measure of flexibility and simple applicability.

The method according to the invention can also be designed in such a manner that a deactivation signal is communicated from the control device to the decision unit at the terminal end, and an activation signal is communicated from the control device to the decision unit at the network end. This embodiment provides the advantage that, for example in the case where, most of all, decisions are made by the decision unit at the terminal end, the decision unit at the terminal end can be deactivated and at the same time the decision unit at the network end can be activated, if necessary in dependence on the situation.

Furthermore, the method according to the invention can also proceed in such a manner that an activation signal is communicated from the control device to the decision unit at the terminal end, and a deactivation signal is communicated from the control device to the decision unit at the network end. This embodiment is advantageous since it enables the decision-making power to be transferred from the decision unit at the network end to the respective decision unit at the terminal end.

The method according to the invention can also be preferably designed in such a manner that the control device controls at least one further decision unit of the mobile core network and/or at least one further decision unit of at least one of the access networks. This provides the advantage that a number of decision units can be provided at the network end, all of which are controlled by the control device. In this context, further decentralized decision units provide the advantage, for example, that overloading of a central decision unit which must make the decisions for all mobile terminals is avoided.

In a preferred embodiment of the method according to the invention, the control device communicates control information to a control device of a further cellular network. In accordance with the statements in conjunction with the assembly according to the invention, this provides for control even in the case of cellular networks of different network operators, i.e. in the case where the change of access network entails the change of the network operator supplying the mobile terminal. This is frequently the case, for example, in the case of so-called "roaming", i.e. for instance if the mobile terminal is used in a different country (i.e. in a foreign country with reference to the usual home network).

The invention also relates to a mobile terminal for use in a cellular network comprising a number of access networks and a mobile core network connected to the access networks.

With respect to the mobile terminal, the invention is based on the object of specifying a mobile terminal which provides for a flexible and dynamic control of the selection of an access network to be used.

This object is achieved by a mobile terminal for use in a cellular network comprising a number of access networks and a mobile core network connected to the access networks, comprising a decision unit at the terminal end for selecting the access network to be used by the mobile terminal, receiving means for receiving an activation signal or a deactivation signal from a control device of the cellular network and control means for activating and deactivating, respectively, the decision unit at the terminal end.

The mobile terminal according to the invention is preferred since it has a decision unit at the terminal end which, if necessary, can be activated and deactivated, respectively, by the control device of the cellular network.

The mobile terminal according to the invention is preferably designed in such a manner that the decision unit at the terminal end is constructed for selecting the access network to be used by the mobile terminal by means of programmable or configurable rules. This provides the advantage that the network operator or the user of the mobile terminal, for example, can specify in a simple manner the criteria according to which the selection is to take place for the most varied situations which can make it necessary to select an access network to be used.

The mobile terminal according to the invention can be advantageously designed in such a manner that the decision unit at the terminal end is constructed for selecting the access network to be used by the mobile terminal with an existing connection of the mobile terminal to one of the access networks. This is advantageous since the mobile terminal can thus select a further one of the available access networks also in the case where it is already registered in one of the available access networks. This can happen, for example, in the case of a deterioration in the transmission quality, for instance due to leaving the coverage of the access network currently used or due to the most varied further events.

In a further preferred embodiment, the decision unit at the terminal end is constructed for selecting the access network to be used by the mobile terminal when the mobile terminal is switched on. This advantageously provides for a selection at the terminal end of the access network to be used also in the case where no connection is yet set up to one of the access networks. In addition, the invention relates to a control device in a cellular network which has a mobile core network and a number of access networks for connecting at least one mobile terminal to the mobile core network.

With respect to the control device, the invention is based on the object of specifying a control device which provides for flexible and dynamic control of the selection of an access network to be used.

According to the invention, this object is achieved by a control device in a cellular network which has a mobile core network and a number of access networks for connecting at least one mobile terminal to the mobile core network, wherein the control device has control means for controlling at least one decision unit at the terminal end, used for selecting the access network to be used by the mobile terminal, and for controlling a decision unit at the network end, used for selecting the access network to be used by the mobile terminal, in the cellular network.

The control device according to the invention is preferred since it provides both for controlling the decision unit at the terminal end and for controlling the decision unit at the network end.

The control device according to the invention is preferably formed in such a manner that the control device is constructed for controlling the decision unit at the terminal end and the decision unit at the network end by means of programmable or configurable rules. In accordance with the previous statements, the use of programmable or configurable rules is preferred due to the flexibility provided as a result and the possibility of taking into consideration changes or extensions in a rapid and simple manner.

In a preferred embodiment, the control device according to the invention is constructed for communicating activation and deactivation signals, respectively, to the decision unit at the terminal end and/or the decision unit at the network end. The control device can thus advantageously specify in dependence on a situation whether the selection decisions should be made at the terminal end or at the network end.

In a further preferred embodiment, the control device according to the invention is constructed for controlling at least one further decision unit of the mobile core network and/or at least one further decision unit of at least one of the access networks. This is advantageous since the control device can thus also control a multiplicity of decision units in the cellular network. These decision units at the network end can in each case be directly connected to the control device or arranged in a hierarchical structure.

The control device according to the invention preferably has means for connecting to a further control device of a further cellular network. This advantageously provides for a transmission of information between the control devices of the two cellular networks.

For the further explanation of the invention,

BRIEF DESCRIPTION OF THE SEVERAL VIEWS OF THE DRAWING

FIG. 1 shows in a diagrammatic sketch an exemplary embodiment of the assembly according to the invention with an exemplary embodiment of the mobile terminal according to the invention and an exemplary embodiment of the control device according to the invention, and FIG. 2 shows a second exemplary embodiment of the assembly according to the invention with an exemplary embodiment of the mobile terminal according to the invention and an exemplary embodiment of the control device according to the invention.

DESCRIPTION OF THE INVENTION

FIG. 1 diagrammatically shows an exemplary embodiment of the assembly according to the invention. A mobile terminal 1 is shown which has a decision unit 2 at the terminal end. Furthermore, an access network 3 which has a decision unit 4 at the network end and an access network 5 which has a decision unit 6 at the network end are shown. The two access networks 3 and 5, which can be those according to an arbitrary radio standard such as, for example, the GPRS (General Packet Radio Service), the UMTS (Universal Mobile Telecommunication System), the GSM (Global System for Mobile Communications), the CDMA (Code Division Multiple Access), or the WLAN (Wireless Local Area Network) standard, are connected to a mobile core network 7 and, together with this, form a cellular network.

The mobile core network 7 has a decision unit 8 at the network end and a control device 10. The control device 10 is connected to the decision units 4, 6 and 8 at the network end and can send signaling or control messages to the decision unit 2 at the terminal end. This occurs via one of the two access networks 3 and 5, a direct connection between the control device 10 and the mobile terminal 1 being drawn in FIG. 1 for reasons of clarity. It should be noted generally that in FIG. 1, only the connections between the various components which are of the greatest importance for the explanation of the invention are indicated, the arrows indicating that control is effected by the control device 10.

If the mobile terminal 1 then changes its geographic location, for example, as indicated by the thick vertical arrows, the mobile terminal 1 may leave the geographic coverage of the access network currently used by it, which is not shown in FIG. 1. In this situation, the necessity exists that a selection of the access network to be used from the set of the two basically available access networks 3 and 5 is carried out by or for the mobile terminal 1, respectively. As an alternative, the situation could also exist that the mobile terminal 1 has just been switched on and a selection of one of the access networks 3 and 5 is required for this reason. Other scenarios which lead to a selection of one of a number of available access networks are conceivable such as, for example, starting of a service for which the access network currently used is unsuitable due to its characteristics.

In principle, the access network to be used can be selected both by the decision unit 2 at the terminal end and by one of the decision units 4, 6 or 8 at the network end. In this context, it depends on the respective situation and the given boundary conditions whether a decision at the terminal end or at the network end is to be preferred. The control device 10 makes it possible then to dynamically establish whether the decision unit 2 at the terminal end or one of the decision units 4, 6 or 8 at the network end should take over the selection of the access network. In this context, the control device 10 can also specify, if necessary, which one of the decision units 4, 6 or 8 at the network end is to make the selection decision. In this context, the control device 10 is controlled by configurable or programmable rules. Thus, the control device 10 can use, for example, individual rules for each mobile terminal (e.g. 1) or for its user, respectively. In addition, rules can also be defined which apply to all mobile terminals or a predetermined selection of mobile terminals such as, e.g., for those which are located in a predetermined location area. In this context, the rules are deposited in a storage device, not shown in FIG. 1, which is allocated to the control device 10.

The most varied scenarios are conceivable which can lead to the control device 10 having a controlling effect on the decision units 2, 4, 6, 8. Thus, for example, it can be defined by the network operator that, in the standard case, each mobile terminal should be allowed to select the access network used by it by itself. In this case, the decision unit 2 of the mobile terminal 1 makes the corresponding decision, for example on the basis of rules defined for the mobile terminal 1 which may be stored for example in a storage device of the mobile terminal 1. The storage device can be a fixed component of the mobile terminal 1 or a memory card, which can be separated from the mobile terminal 1, for example in the form of a SIM (Subscriber Identity Module) card used for customization of mobile terminals.

One rule can specify, for example, that the access network with the lowest costs, the highest data transmission rate or the best transmission quality should be selected. In addition, much more complex conditions can also be defined with the aid of the rules.

As an alternative, the network operator of the cellular network could decide that the decision of mobility (i.e. the selection of the access network to be used) should be made at the network end for the mobile terminal 1 (or all mobile terminals using the cellular network). In this case, the control device 10 of the mobile core network 7 would send a deactivation signal to the decision unit 2 at the terminal end of the mobile terminal 1 and at the same time send an activation signal, for example, to the decision unit 8 at the network end in the mobile core network 7 of the cellular network. This has the result that selection is switched from a selection at the terminal end of the access network used to a selection at the network end. The decision unit 8 at the network end can then delegate the decision-making power—if it has been allowed to do this by the control device 10—to the decision units 4 and 6 at the network end arranged in the access networks 3 and 5. In this case, the decision units 4 and 6 at the network end thus make the decisions with regard to the selection of access network by means of the rules available to them. In addition, the rules to be applied can also be communicated to the decision units 4 and 6 at the network end by the decision unit 8 at the network end or the control device 10.

Apart from the scenarios, previously described, of a general decision at the terminal end about the selection of access network or of a general selection at the network end, there is the possibility of further, more differentiated procedures.

Thus, for example, the information that one of the access networks is overloaded in a certain region of the cellular network can be present in the mobile core network 7. In this case, the control device 10 instructs all mobile terminals (e.g. 1) in this region and the adjoining regions to deactivate their decision unit at the terminal end (e.g. 2). Since the decision unit 8 at the network end has information on the overloaded region, it can make decisions for the selection of access network for the mobile terminals affected (e.g. 1) in such a manner that the overloaded access network is avoided as far as possible in the region concerned. The same applies, for example, to the case where maintenance work is carried out in one of the available access networks in a predetermined region. In this case, the control device 10 can again switch off the decision units at the terminal end of the mobile terminals located in the region (e.g. 1) so that the decision unit 8 at the network end can leave the relevant access network in the region concerned out of consideration in the selection for the duration of the maintenance work. In general, the control device 10 and the decision unit 8 at the network end can be preferably implemented in one component which simplifies the assembly.

In addition, it is conceivable that a network operator, in order to avoid overload situations, allows a free selection of the access network at any time only to preferred users. In this case, the decision unit 10 can instruct the mobile terminals of users not preferred in this way to switch off their decision units at the terminal end in heavy-traffic periods.

It is also conceivable that, for example, a set of rules which overwrites the rules present in the mobile terminal 1 is communicated to the decision unit 2 at the terminal end by the control device 10. The communicated rules can be, for example, instructions of the type "avoid access network A in location area xyz" or "prefer UMTS instead of WLAN". These instructions can also be provided with validity periods so that the mobile terminals (e.g. 1) can carry out the selection of access network largely autonomously outside the periods concerned.

Furthermore, a statistical mode is also conceivable in which the decision unit 2 at the terminal end is instructed to make the decision about the selection of access network by itself only when a random number generated from the range of values of 0 to 10 has, for example, a value of greater than 3. If this is not the case, the decision about selection should be made at the network end for the corresponding mobile terminal.

In general, the control device 10 thus provides the possibility of adapting in a dynamic, situation-dependent and flexible manner the responsibility for selecting the access network to be used between the decision unit 2 at the terminal end and the decision units 4, 6 and 8 at the network end. As a result, a meaningful and dynamic compromise between the aim of greatest possible independence of the mobile terminal 1 and central control of the selection of the access network by the cellular network is advantageously provided for. Under normal conditions, the mobile terminal 1 can thus independently select the access network to be used by it by means of the decision unit 2 at the terminal end. This avoids unnecessary signaling between the cellular network and the mobile terminal 1. Furthermore, a high real-time capability is ensured, i.e. the mobile terminal 1 (and similarly all other mobile terminals which use the cellular network) can react in the fastest possible way to changing network conditions. Under certain circumstances, however, it is advantageous or of fundamental significance, respectively, that the selection of the access network can be influenced at the network end for the mobile terminal 1. The control device 10 then makes it possible to perform a selection of the access network at the network end for predetermined mobile terminals (e.g. 1) for example in selected regions and under certain conditions. As a result, the decisions can be made in such a manner that they provide the best possible result for the overall system from the point of view of the cellular network.

FIG. 2 shows a further exemplary embodiment of the assembly according to the invention. In contrast to FIG. 1, it shows the case where access networks 23, 24, 25 and 26 of two different network operators which in each case have an independent mobile core network 27 and 32, respectively, can be of use to a mobile terminal 21 which has a decision unit 22 at the terminal end. The mobile core networks 27 and 32 of the two cellular networks in each case have their own control device 28 and 30, respectively, and their own decision units 29 and 31 at the network end.

To enable the network operator of the cellular network with the mobile core network 27, to which the user of the mobile terminal 21 has a contractual relation, to specify the extent to which the mobile terminal 21 is allowed to perform an independent selection of the access network by means of its decision unit 22 even in the utilization of one of the other two access networks 25 and 26 by the mobile terminal 21, the control device 28 of the cellular network with the mobile core network 27 transmits to the control device 30 of the mobile core network 32 of the cellular network of the other network operator a set of general decision rules. These rules describe the behavior desired by the network operator for mobile terminals of his users in the case of a stay in the cellular network of the other network operator. Thus, the network operator can specify, for example, that a preferred user should be authorized for a free selection of the access network even in this case whilst this should not be the case for other users. In this context, the extent to which the rules communicated by the control device 28 are observed lies ultimately in the decision-making power of the control device 30 of the mobile core network 32 of the other network operator.

It should be pointed out that, in the exemplary embodiment of FIG. 2, a decision unit 28 or 30 at the network end is in each case only present in the mobile core networks 27 and 32, i.e. the access networks 23, 24, 25 and 26 themselves do not have any further decision units at the network end.

The invention claimed is:

1. An assembly, comprising:
    a cellular network having a mobile core network and a plurality of access networks;
    at least one mobile terminal having a terminal decision unit for selecting one of said plurality of access networks to be used by said mobile terminal for connecting the mobile terminal to said mobile core network;
    said cellular network further containing:
        a network decision unit for selecting said one of said plurality of access networks to be used by said mobile terminal;
        a control device for controlling said terminal decision unit and said network decision unit; and
        at least one of said mobile core network and at least one of said plurality of access networks having at least one further decision unit controlled by said control device.

2. The assembly according to claim 1, wherein at least one of said network decision unit and said control device are disposed one of completely and partially in said mobile core network of said cellular network.

3. The assembly according to claim 1, wherein at least one of said terminal decision unit and said network decision unit is constructed for selecting said one of said plurality of access networks to be used by said mobile terminal by one of programmable rules and configurable rules.

4. The assembly according to claim 1, wherein said control device controls said terminal decision unit and said network decision unit by use of one of programmable rules and configurable rules.

5. The assembly according to claim 1, wherein said control device is constructed for communicating activation and deactivation signals, respectively, to at least one of said terminal decision unit and said network decision unit.

6. The assembly according to claim 1, wherein at least one of said terminal decision unit and said network decision unit is constructed for selecting said one of said plurality of access networks to be used by said mobile terminal with an existing connection of said mobile terminal to another one of said plurality of access networks.

7. The assembly according to claim 1, wherein at least one of said terminal decision unit and said network decision unit is constructed for selecting said one of said plurality of access networks to be used by said mobile terminal when said mobile terminal is switched on.

8. The assembly according to claim 1, further comprising a further control device of a further cellular network connected to said control device.

9. A method for operating an assembly containing a cellular network having a mobile terminal, a mobile core network and a plurality of access networks for connecting the mobile terminal to the mobile core network, the mobile terminal having a terminal decision unit for selecting an access network of the plurality of access networks to be used by the mobile terminal and the cellular network further having a network decision unit for selecting the access network to be used by the mobile terminal, which comprises the steps of:
    controlling at least one of the terminal decision unit and the network decision unit with a control device disposed in the cellular network; and
    controlling, via the control device, at least one of at least one further decision unit of the mobile core network and at least one further decision unit of at least one of the plurality of access networks.

10. The method according to claim 9, which further comprises using at least one of the network decision unit and the control device, disposed one of completely and partially in the mobile core network of the cellular network.

11. The method according to claim 9, which further comprises controlling at least one of the terminal decision unit and the network decision unit via the control device by one of configurable rules and programmable rules.

12. The method according to claim 9, which further comprises:

communicating a deactivation signal from the control device to the terminal decision unit; and communicating an activation signal from the control device to the network decision unit.

13. The method according to claim 9, which further comprises:

communicating an activation signal from the control device to the terminal decision unit; and communicating a deactivation signal from the control device to the network decision unit.

14. The method according to claim 9, which further comprises communicating control information from the control device to a further control device of a further cellular network.

15. A control device in a cellular network having a mobile core network and a plurality of access networks for connecting at least one mobile terminal to the mobile core network, the control device comprising:

a control means for controlling at least one terminal decision unit, used for selecting an access network of said plurality of access networks to be used by the mobile terminal, and for controlling a network decision unit, used for selecting the access network of said plurality of access networks to be used by the mobile terminal, in the cellular network, the control device being constructed for controlling at least one further decision unit of the mobile core network and/or at least one further decision unit of at least one of the plurality of access networks.

16. The control device according to claim 15, wherein the control device controls the terminal decision unit and the network decision unit by one of programmable rules and configurable rules.

17. The control device according to claim 15, wherein the control device is constructed for communicating activation and deactivation signals, respectively, to at least one of the terminal decision unit and the network decision unit.

18. The control device according to claim 15, further comprising means for connecting to a further control device of a further cellular network.

* * * * *